(12) United States Patent
Hosaka et al.

(10) Patent No.: US 8,725,340 B1
(45) Date of Patent: May 13, 2014

(54) MOTOR DRIVE CONTROLLER AND ELECTRIC POWER-ASSISTED VEHICLE

(71) Applicant: Taiyo Yuden Co., Ltd., Tokyo (JP)

(72) Inventors: Yasuo Hosaka, Tokyo (JP); Kazuo Asanuma, Tokyo (JP); Hirokazu Shirakawa, Tokyo (JP); Kuniaki Kawagoe, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 14/017,134

(22) Filed: Sep. 3, 2013

(30) Foreign Application Priority Data

Oct. 29, 2012 (JP) .................................. 2012-237964

(51) Int. Cl.
*B60L 9/00* (2006.01)

(52) U.S. Cl.
USPC ............................................................ 701/22

(58) Field of Classification Search
None
See application file for complete search history.

(56) References Cited

U.S. PATENT DOCUMENTS

| | | | |
|---|---|---|---|
| 1,291,233 A | 1/1919 | Storer | |
| 4,111,274 A | 9/1978 | King et al. | |
| 2011/0304200 A1* | 12/2011 | Saida et al. | 307/9.1 |
| 2012/0014239 A1* | 1/2012 | Nishigata et al. | 369/53.35 |
| 2012/0241264 A1 | 9/2012 | Hosaka et al. | |
| 2013/0317679 A1* | 11/2013 | Tanaka et al. | 701/22 |

FOREIGN PATENT DOCUMENTS

| | | |
|---|---|---|
| EP | 0 976 649 A2 | 2/2000 |
| EP | 0 994 015 A2 | 4/2000 |
| EP | 1 886 913 A2 | 2/2008 |
| EP | 2 0395 56 A2 | 3/2009 |
| JP | H10-81290 A | 3/1998 |
| JP | 2004-202002 A | 7/2004 |
| JP | 2008-44414 A | 2/2008 |
| JP | 2010-35376 A | 2/2010 |
| JP | 2011-83081 A | 4/2011 |

OTHER PUBLICATIONS

U.S. Appl. No. 13/972,644, filed Aug. 21, 2013.
European Search Report dated Dec. 2, 2013, in a counterpart European patent application No. 13004831.7.

* cited by examiner

*Primary Examiner* — Thomas Tarcza
*Assistant Examiner* — Adam Alharbi
(74) *Attorney, Agent, or Firm* — Chen Yoshimura LLP

(57) ABSTRACT

A controller for driving a motor in a motor driven vehicle, provided with: a detection part, a control coefficient computing part, and a control part. The control coefficient computing part identifies, as a first vehicle speed, the speed of the vehicle when the detection part detects a start signal for regeneration control, the control coefficient computing part assigning a prescribed value to a control coefficient that determines a value of a control parameter that controls the motor relative to a target value of the control parameter. The target value is a value of the control parameter at which the motor achieves a desired power generation efficiency, and the control coefficient computing part increases the control coefficient if a current vehicle speed becomes faster than the first vehicle speed, and decreases the control coefficient if the current vehicle speed becomes slower than the first vehicle speed.

7 Claims, 14 Drawing Sheets

MOTOR DRIVE CONTROLLER AND ELECTRIC POWER-ASSISTED VEHICLE

This application claims the benefit of Japanese Application No. 2012-237964, filed in Japan on Oct. 29, 2012, which is hereby incorporated by reference in its entirety

BACKGROUND OF THE INVENTION

1. Field of the Invention

The present invention relates to regeneration control technology in an electric power-assisted vehicle.

2. Description of Related Art

There are electric power-assisted vehicles, such as electric bicycles assisted by battery power, which have sensors provided on brake levers. The sensors respond to the usage of the brakes by the rider in order to enable regeneration operation of the motor. This stores the kinetic energy of the vehicle into the battery, and improves the travel distance of the vehicle.

Bicycles do not have engine brakes like automobiles and motorcycles do, resulting in a sense of danger when descending long downward slopes at a high speed. With bicycles, the speed must be controlled through operation of the brakes. However, there are problems such as this kind of braking operation being bothersome for the rider, and also hand fatigue occurring due to prolonged braking operation.

There is technology that automatically performs regenerative braking according to pre-determined configurations in electric power-assisted vehicles such as in electric bicycles, but these pre-determined configurations do not necessarily reflect the intentions of the rider. In other words, the speed at which a rider feels comfortable going down a long slope varies depending on road width, weather conditions, the physical health of the rider, and the like. Accordingly, depending on the rider, there may be a deceleration that is excessive enough to cause panic, or conversely an insufficient deceleration that causes the rider to feel danger.

RELATED ART DOCUMENTS

Patent Documents

Patent Document 1: Japanese Patent Application Laid-Open Publication No. H10-81290
Patent Document 2: Japanese Patent Application Laid-Open Publication No. 2008-44414
Patent Document 3: Japanese Patent Application Laid-Open Publication No. 2010-35376
Patent Document 4: Japanese Patent Application Laid-Open Publication No. 2011-83081

SUMMARY OF THE INVENTION

Thus, one aspect of the present invention aims at providing a technology for enabling regenerative braking force that is consistent with the intentions of the rider.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, a controller for driving a motor in a motor driven vehicle includes: (A) a detection part that detects a start signal or stop signal for regeneration control from a rider; (B) a control coefficient computing part that identifies, as a first vehicle speed, the speed of the vehicle when the detection part detects the start signal for regeneration control, the control coefficient computing part assigning a prescribed value to a control coefficient that determines a value of a control parameter that controls the motor relative to a target value of the control parameter, the target value being a value of the control parameter at which the motor achieves a desired power generation efficiency, the control coefficient computing part increasing the control coefficient if a current vehicle speed becomes faster than the first vehicle speed and decreasing the control coefficient if the current vehicle speed becomes slower than the first vehicle speed and continuing the increasing and decreasing until the detection part detects the stop signal for regeneration control; and (C) a control part that derives a value of the control parameter in accordance with the target value of the control parameter and the control coefficient computed by the control coefficient computing part, the control part forwarding the derived value of the control parameter to the motor to control driving of the motor.

If this is done, regenerative braking force that is consistent with the intentions of the rider will be enabled, and regeneration control will be performed so as to maintain the first vehicle speed as much as possible. Therefore, an appropriate degree of regenerative braking force will be in effect without repeated or prolonged operation of the brakes by the rider.

The control coefficient computing part described above may identify, as a second vehicle speed, the speed of the vehicle when the detection part detects another start signal for regeneration control before the stop signal for regeneration control has been detected, the control coefficient computing part increasing the control coefficient if a current vehicle speed becomes faster than the second vehicle speed, and decreasing the control coefficient if the current vehicle speed becomes slower than the second vehicle speed. If done as such, the rider can easily signal a change of his intentions depending on situational changes without performing a stop signal for regeneration control.

The control coefficient computing part described above operates to cancel regeneration control if the stop signal for regeneration control is detected by the detection part. In other words, the settings can be changed in accordance with the intentions of the rider.

The start signal for regeneration control described above may be detected by: reverse rotation of a pedal greater than or equal to a prescribed angle; an ON state of a signaling switch that signals the start of regeneration control; and a brake switch turning ON continuously within a prescribed amount of time. A method can be adopted that allows for easy signaling.

The stop signal for regeneration control may be detected by: forward rotation of the pedal exceeding a prescribed angle; torque input; an OFF state of a signaling switch that signals the start of regeneration control; or a brake switch (a brake switch separate from the switch for the start signal, for example) turning ON repeatedly within a prescribed amount of time.

The control coefficient computing part described above may, even if the start signal for regeneration control has not been detected, increase the control coefficient if the current vehicle speed becomes faster than the first vehicle speed after the control coefficient reaches a minimum value. As such, regenerative braking will be restarted automatically, and the rider will not have to be inconvenienced by repeating operations.

Programs can be created for implementing such processes as described above on a microprocessor, and the programs are stored on a computer readable storage medium or storage device such as a floppy disk, an optical disc such as a CD-ROM, a magneto-optical disc, a semiconductor memory (ROM, for example), or a hard-disk, for example. Half-processed data is temporarily stored in a storage device such as RAM (Random Access Memory).

According to one aspect of the present invention, regenerative braking force that is consistent with the intentions of the rider is enabled.

It is to be understood that both the foregoing general description and the following detailed description are exemplary and explanatory, and are intended to provide further explanation of the invention as claimed.

DETAILED DESCRIPTION OF THE PREFERRED EMBODIMENTS

Figure 1:
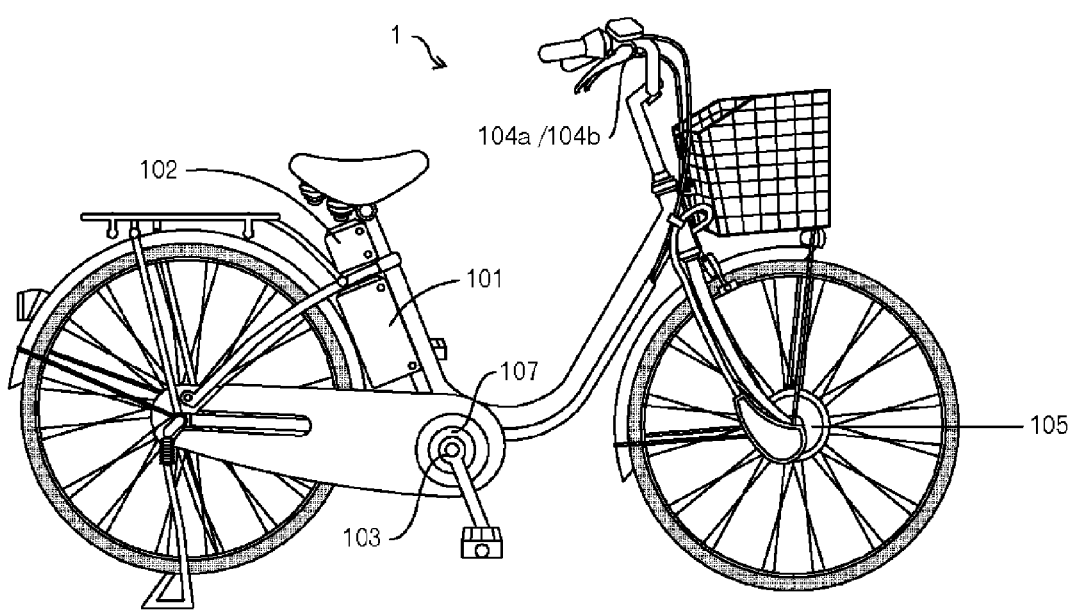
FIG. 1 is an external appearance of a motor-assisted bicycle.

FIG. 1 is an external view of one example of a motor-assisted bicycle, which is an electric power-assisted vehicle, in the present embodiment. This motor-assisted bicycle 1 is equipped with a motor driver device. The motor driver device has a rechargeable battery 101, a controller 102 for driving a motor, a torque sensor 103, brake sensors 104a and 104b, a motor 105, and a pedal rotation sensor 107. Although not shown in FIG. 1, the motor driver device also has a signaling switch 106 for signaling regeneration control according to the present embodiment.

The rechargeable battery 101 is a lithium ion rechargeable battery with a maximum supply voltage (the voltage when fully charged) of 24V, for example. However, other types of batteries, such as a lithium ion polymer rechargeable battery or a nickel-hydrogen storage battery may also be used, for example.

The torque sensor 103 is provided on the wheel installed on the crankshaft, and detects the pedal force of the rider and outputs these detection results to the controller 102 for driving a motor. The pedal rotation sensor 107 is provided on the wheel installed on the crankshaft, in a similar manner to the torque sensor 103, and outputs signals based on the rotations to the controller 102 for driving a motor. The pedal rotation sensor 107 can also detect the rotation direction of the pedal such as forward or reverse in addition to the rotation angle.

Figure 2:
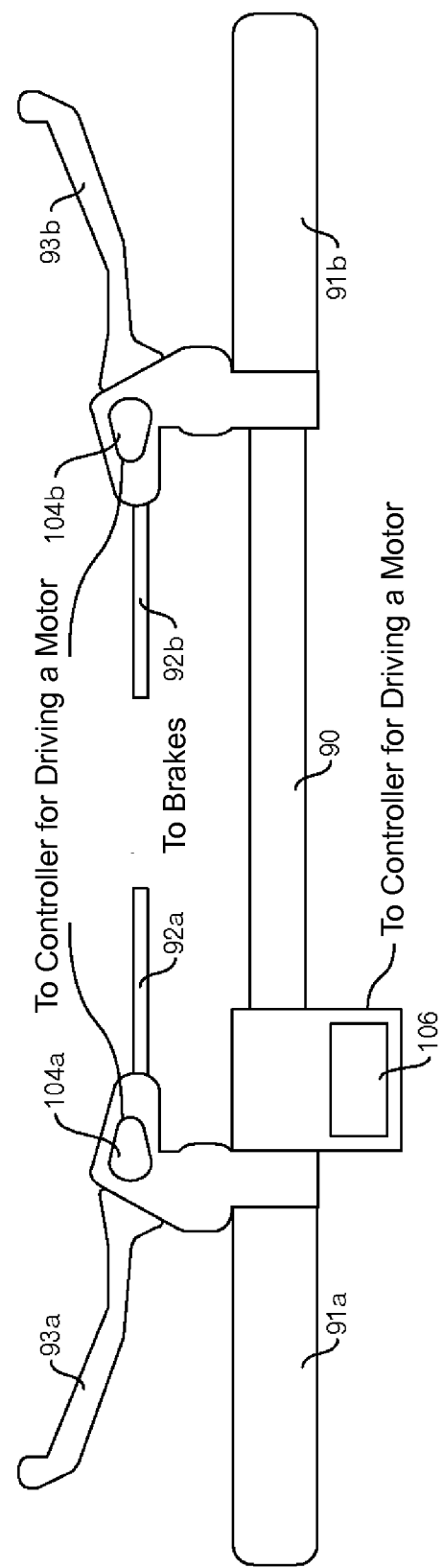
FIG. 2 is a view for explaining brake sensors.

As shown in FIG. 2, the brake sensor 104a is in an ON state when a grip 91a and a brake lever 93a provided on the left end of a handle part 90 are gripped to a certain degree, and then a signal indicating this ON state is transmitted to the controller 102 for driving a motor. A brake wire 92a is pulled to the degree to which the grip 91a and the brake lever 93a are gripped, and the rear wheel mechanically brakes, for example.

The brake sensor 104b is also configured to be in an ON state when a grip 91b and a brake lever 93b are gripped to a certain degree, and a signal indicating this ON state is then transmitted to the controller 102 for driving a motor. A brake wire 92b is pulled according to the degree to which the grip 91b and brake lever 93b are gripped, and the front wheel mechanically brakes, for example.

More specifically, the brake sensors 104a and 104b are each made of a magnet and a well-known reed switch, for example. The magnets are attached to the brake wires 92a and 92b connected to the brake levers 93a and 93b, in casings that affix the brake levers 93a and 93b and through which the brake wires 92a and 92b pass. The brake levers 93a and 93b turn the reed switch to an ON state when gripped by hand. The reed switch is affixed inside the casing. This reed switch signal is sent to the controller 102 for driving a motor. The configuration of the brake sensors 104a and 104b is not limited to such a method, and may be a method that optically detects brake operation, a method that detects brake operation using a mechanical switch, a method that detects brake operation by changes in electrical resistance, or the like In FIG. 2, the signaling switch 106 for signaling the start or stop of regeneration control according to the present embodiment is provided in the vicinity of the grip 91a, for example. As such, providing the signaling switch 106 close to the grip 91a allows the signaling switch 106 to be turned ON or OFF while gripping the grip 91a. The signaling signals sent by the signaling switch 106 are transmitted to the controller 102 for driving a motor. The signaling switch 106 may be provided in the vicinity of the grip 91b.

The signaling switch 106 can be: (1) a type that is turned to the left or right, with the left being ON and the right being OFF; (2) a type that has two switches, one being ON and one being OFF; or (3) a type that has one switch that switches between ON and OFF when pressed, and the like. In the present embodiment, a type where ON can be continually inputted is preferable.

The motor 105 is a three-phase brushless DC motor with a well-known configuration, for example, and is installed on the front wheel of the motor-assisted bicycle 1, for example. The motor 105 rotates the front wheel, and a rotor is connected to the front wheel so that the rotor rotates according to the rotation of the front wheel. The motor 105 has a rotation sensor such as a Hall element to output rotation information (in other words, the Hall signal) of the rotor to the controller 102 for driving a motor.

Figure 3:
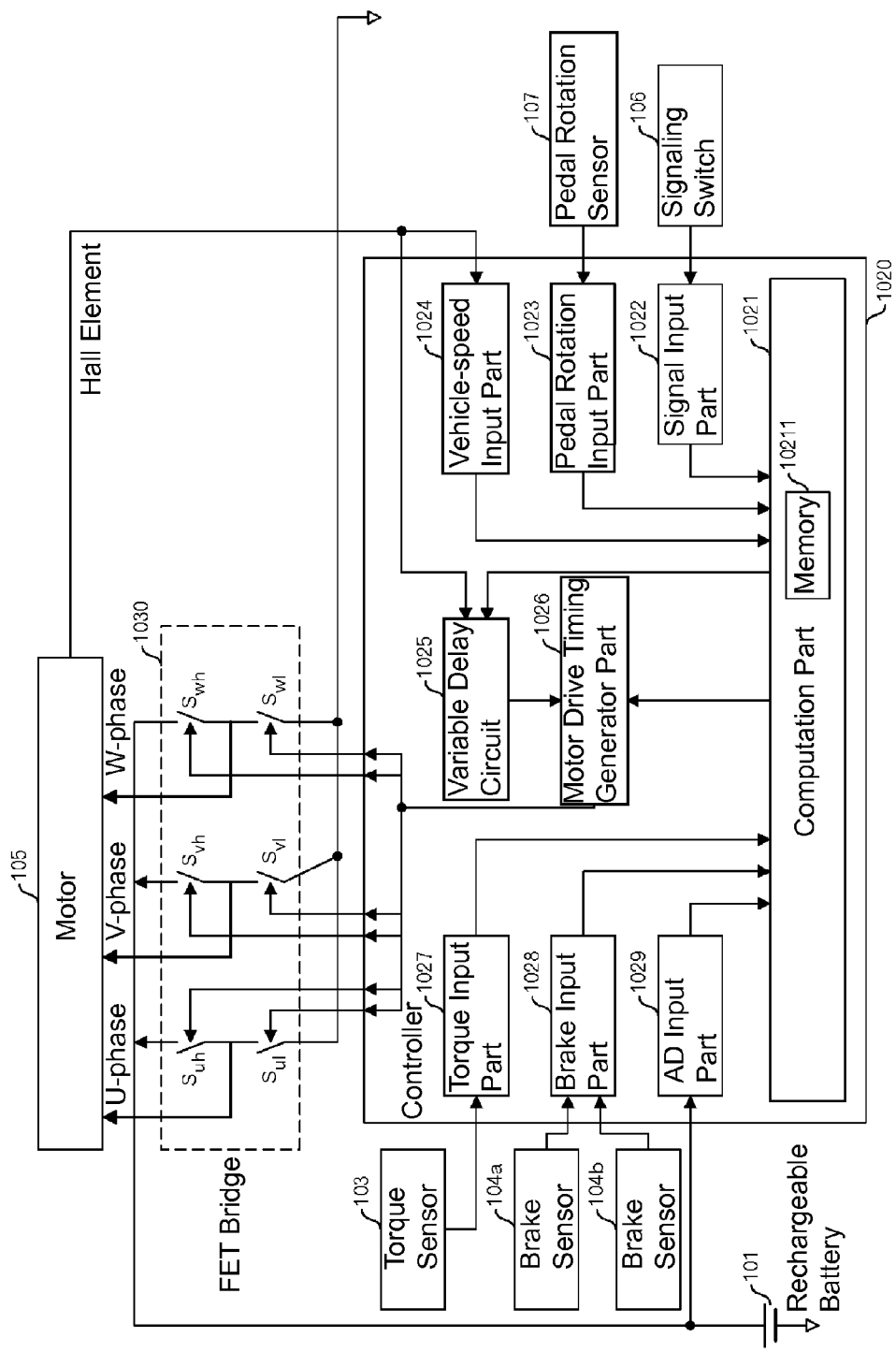
FIG. 3 is a function block diagram of a motor drive controller.

A configuration relating to such a controller 102 for driving a motor of the motor-assisted bicycle 1 is shown in FIG. 3. The controller 102 for driving a motor has a controller 1020 and an FET (Field Effect Transistor) bridge 1030. The FET bridge 1030 contains: a high-side FET ($S_{uh}$) and a low-side FET ($S_{ul}$) that perform U-phase switching for the motor 105, a high-side FET ($S_{vh}$) and a low-side FET ($S_{vl}$) that perform V-phase switching for the motor 105, and a high-side FET ($S_{wh}$) and a low-side FET ($S_{wl}$) that perform W-phase switching for the motor 105. This FET bridge 1030 forms part of a complementary switching amp.

The controller 1020 has a computation part 1021, a signal input part 1022, a pedal rotation input part 1023, a vehicle-speed input part 1024, a variable delay circuit 1025, a motor drive timing generator part 1026, a torque input part 1027, a brake input part 1028, and an AD input part 1029.

The computation part 1021 uses input from the pedal rotation input part 1023, input from the signal input part 1022, input from the vehicle-speed input part 1024, input from the torque input part 1027, input from the brake input part 1028, and input from the AD (Analog-Digital) input part 1029 to do computations as described below, and then outputs the result to the motor drive timing generator part 1026 and the variable delay circuit 1025. The computation part 1021 has a memory 10211, and the memory 10211 stores various data, half-processed data, and the like for use in the computations. The computation part 1021 may be realized by programs executed by a processor, and in such a case the programs may be recorded in the memory 10211.

The signal input part 1022 outputs signals to the computation part 1021 from the signaling switch 106 indicating ON or OFF. The pedal rotation input part 1023 digitizes signals from the pedal rotation sensor 107 that indicate the pedal rotation angle and the rotation direction, and outputs the result to the computation part 1021. The vehicle-speed input part 1024 computes the current vehicle speed from the Hall signal outputted by the motor 105, and outputs the result to the computation part 1021. The torque input part 1027 digitizes a signal corresponding to the force from the torque sensor 103, and outputs the result to the computation part 1021. The brake input part 1028 outputs a signal to the computation part 1021 according to a signal from the brake sensors 104*a* and 104*b* indicating either a no-brake state where no ON signal has been received from either of the brake sensors 104*a* and 104*b*, or a brake state where an ON signal has been received from brake sensor 104*a* or brake sensor 104*b*. The AD input part 1029 digitizes the output voltage from the rechargeable battery 101 and outputs the result to the computation part 1021. The memory 10211 may be provided separately from the computation part 1021.

The computation part 1021 outputs a lead angle value as a result of the computations to the variable delay circuit 1025. The variable delay circuit 1025 adjusts the phase of the Hall signal on the basis of the lead angle value received from the computation part 1021, and outputs the result to the motor drive timing generator part 1026. As a result of the computations, the computation part 1021 outputs a PWM (Pulse Width Modulation) code, which corresponds to the duty ratio of the PWM, to the motor drive timing generator part 1026, for example. The motor drive timing generator part 1026 generates and outputs switching signals for every FET contained on the FET bridge 1030 on the basis of the post-adjusted Hall signal from the variable delay circuit 1025 and the PWM code from the computation part 1021.

Figure 4:
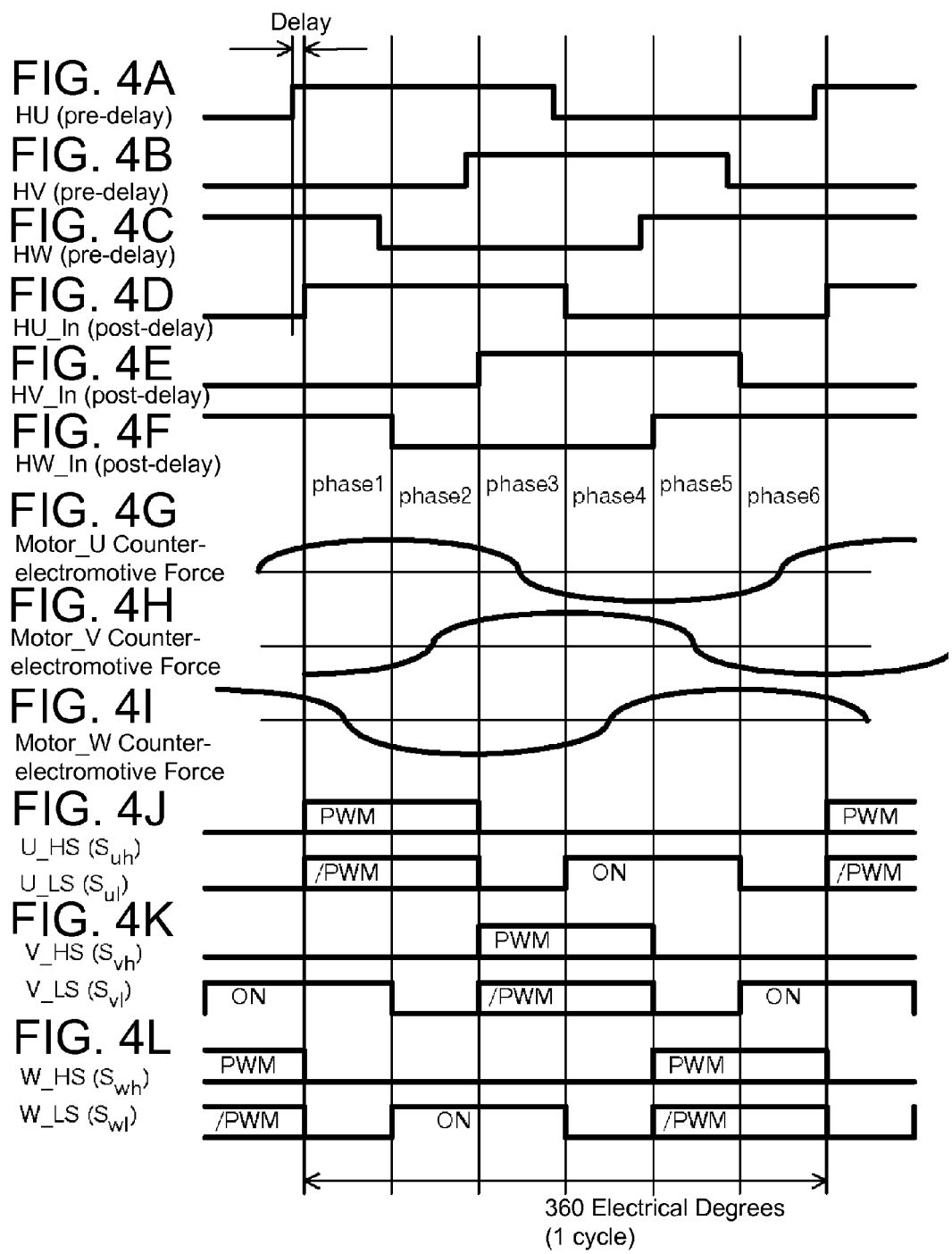
FIGS. 4A to 4L are waveform diagrams for explaining the basic operation of motor driving.

FIGS. 4A to 4L will be used to explain the basic motor drive operation with the configuration shown in FIG. 3. FIG. 4A indicates a U-phase Hall signal HU outputted by the motor 105, FIG. 4B indicates a V-phase Hall signal HV outputted by the motor 105, and FIG. 4C indicates a W-phase Hall signal HW outputted by the motor 105. As such, the Hall signal indicates the rotation phase of the motor. The rotation phase is not necessarily obtained as a continuous value here, and may be set to be obtained by other sensors or the like. As also described below, in the present embodiment the Hall element of the motor 105 is placed so the Hall signal, as shown in FIGS. 4A to 4C, is outputted at a slightly advanced phase, and is adjustable by the variable delay circuit 1025. Therefore, a post-adjusted U-phase Hall signal HU_In as shown in FIG. 4D is outputted from the variable delay circuit 1025 to the motor drive timing generator part 1026, a post-adjusted V-phase Hall signal HV_In as shown in FIG. 4E is outputted from the variable delay circuit 1025 to the motor drive timing generator part 1026, and a post-adjusted W-phase Hall signal HW_In as shown in FIG. 4F is outputted from the variable delay circuit 1025 to the motor drive timing generator part 1026.

One Hall signal cycle is divided into six phases of 360 electrical degrees.

As shown in FIGS. 4G to 4I, counter-electromotive force voltages occur such as a Motor_U counter-electromotive force at the U-phase terminal, a Motor_V counter-electromotive force at the V-phase terminal, and a Motor_W counter-electromotive force at the W-phase terminal. In order to drive the motor 105 with driving voltage that matches the phases of the motor counter-electromotive force voltages, a switching signal as shown in FIGS. 4J to 4L is outputted to the gate of every FET on the FET bridge 1030. U_HS in FIG. 4J represents the gate signal for the U-phase high-side FET ($S_{uh}$) and U_LS represents the gate signal for the U-phase low-side FET ($S_{ul}$). PWM and /PWM represent the ON/OFF period in a duty ratio according to the PWM code, which is the computational result from the computation part 1021. Since this is a complementary type, if PWM is ON then /PWM is OFF, and if PWM is OFF then /PWM is ON. In the ON area of the low-side FET ($S_{ul}$), U_LS is always ON. V_HS in FIG. 4K represents a gate signal of the V-phase high-side FET ($S_{vh}$), and V_LS represents a gate signal of the V-phase low-side FET ($S_{vl}$). The meaning of the characters is the same as in FIG. 4J. W_HS in FIG. 4L represents a gate signal of the W-phase high-side FET ($S_{wh}$), and W_LS represents a gate signal of the W-phase low-side FET ($S_{wl}$). The meaning of the characters is the same as in FIG. 4J.

As such, the U-phase FETs ($S_{uh}$ and $S_{ul}$) perform PWM switching in phase 1 and 2, and the U-phase low-side FET ($S_{ul}$) turns ON in phase 4 and 5. The V-phase FETs ($S_{vh}$ and $S_{vl}$) perform PWM switching in phase 3 and 4, and the V-phase low-side FET ($S_{vl}$) turns on in phase 6 and 1. The W-phase FETs ($S_{wh}$ and $S_{wl}$) perform PWM switching in phase 5 and 6, and the W-phase low-side FET ($S_{wl}$) turns ON in phase 2 and 3.

If such signals are outputted to suitably control the duty ratio, then the motor 105 can be driven at the desired torque.

Figure 5:
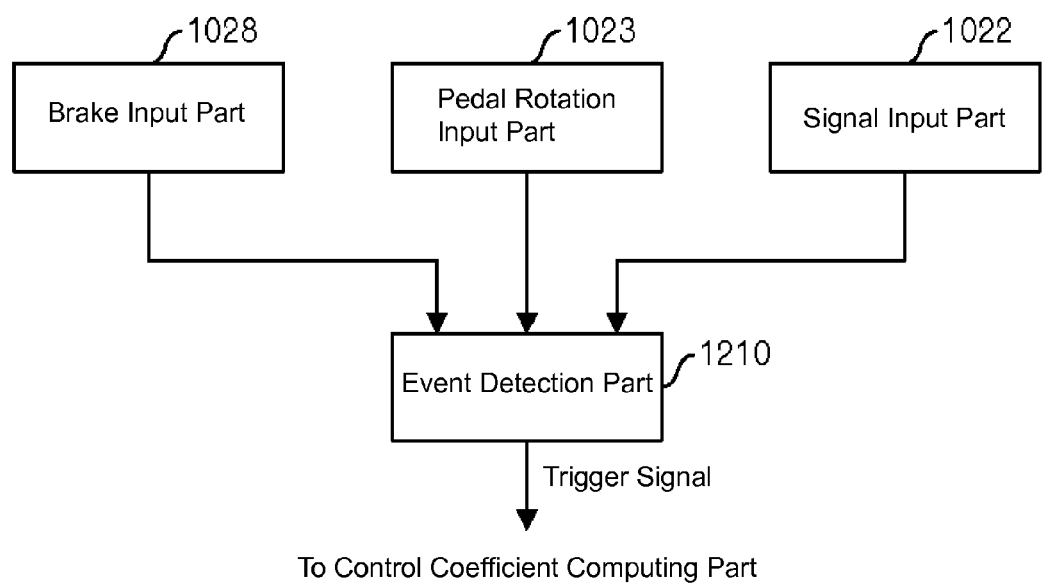
FIG. 5 is a function block diagram of a computation part.
Figure 6:
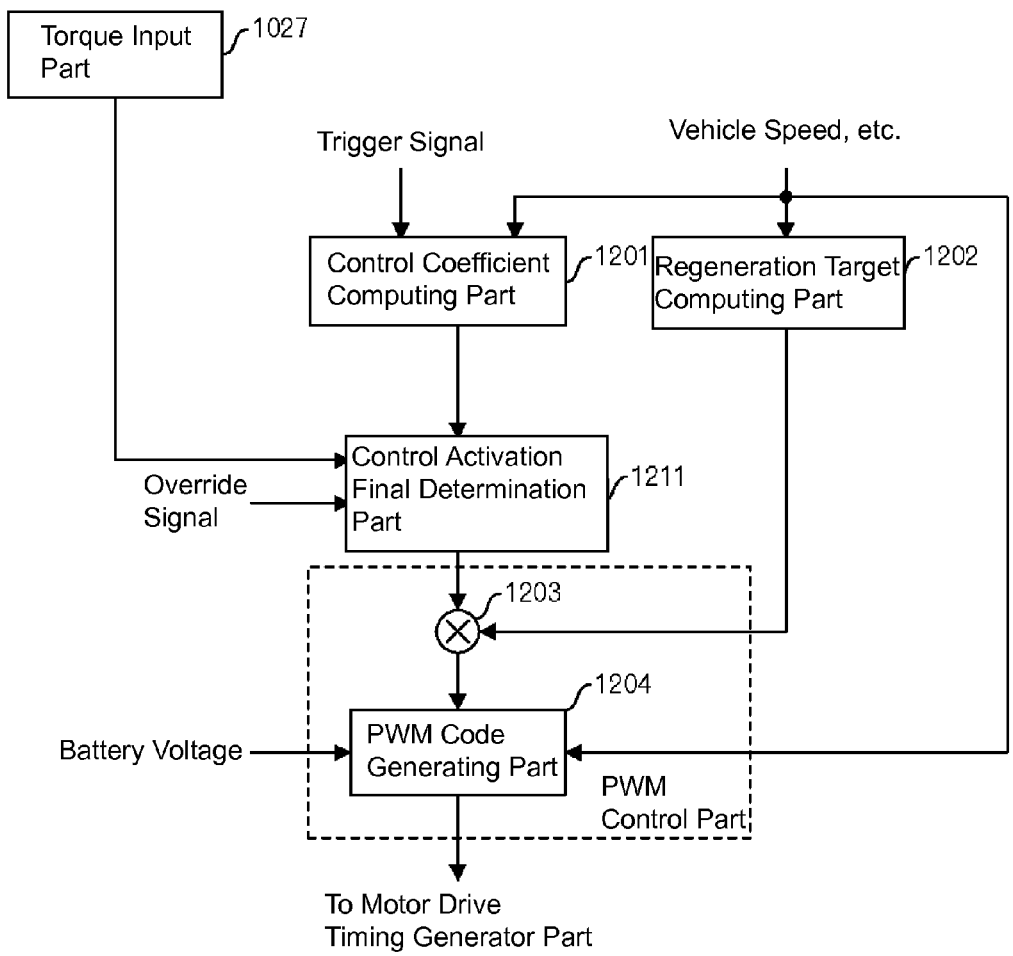
FIG. 6 is a function block diagram of a computation part.

Next, a function block diagram of the computation part 1021 is shown in FIGS. 5 and 6. First, FIG. 5 shows a function block diagram for outputting a trigger signal. As shown in FIG. 5, an event detection part 1210 is connected with the brake input part 1028, the pedal rotation input part 1023, and the signal input part 1022.

In the present embodiment, (A) when the signal input part 1022 detects a signal from the signaling switch 106 indicating that the signaling switch 106 is ON and outputs the signal to the event detection part 1210, the event detection part 1210 then outputs a trigger signal indicating the start of regeneration control according to the signal from the signal input part 1022. (B) When the event detection part 1210 receives a signal from the pedal rotation input part 1023 indicating the pedal rotation angle and rotation direction and detects a reverse rotation of the pedal greater than or equal to a preset angle degree, the event detection part 1210 then outputs a trigger signal indicating the start of regeneration control. (C)

When the event detection part 1210 receives a signal from the brake input part 1028 indicating the brake state and detects that either one of brake sensors 104a or 104b is continually ON within a prescribed period of time, the event detection part 1210 then outputs a trigger signal indicating the start of regeneration control. The event detection part 1210 may be a configuration that processes at least one of (A) to (C).

In the present embodiment, if the event detection part 1210 detects any one of (A) to (C) again without outputting a trigger signal that indicates the stop of regeneration control, then a trigger signal indicating another start of regeneration control is outputted.

However, in the present embodiment, (D) when the signal input part 1022 detects a signal from the signaling switch 106 indicating that the signaling switch 106 is OFF and outputs the signal to the event detection part 1210, the event detection part 1210 then outputs a trigger signal indicating the stop of regeneration control according to the signal from the signal input part 1022. (E) When the event detection part 1210 receives a signal from the pedal rotation input part 1023 indicating that the pedal rotation angle and rotation direction and detects a forward rotation of the pedal greater than or equal to a preset angle degree, the event detection part 1210 then outputs a trigger signal indicating the stop of regeneration control. (F) When the event detection part 1210 receives a signal from the brake input part 1028 indicating the brake state after outputting the trigger signal indicating the start of regeneration control, and detects that the opposite brake sensor 104a or brake sensor 104b from the brake sensor that was on in (C) has been continuously ON within a prescribed period of time, the event detection part 1210 then outputs a trigger signal indicating the stop of regeneration control. The event detection part 1210 may be a configuration that processes at least one of (D) to (F).

In other words, the rider may perform signaling for regeneration control with the brakes, with the pedals, or with the signaling switch 106. At least one of such signaling methods may be provided.

When signaling regeneration control with the pedals, just the output from the pedal rotation sensor 107 may be used for detection, or this output may be used in combination with output from the torque sensor 103. A stop of rotation control may be detected by using output from the torque sensor 103 in addition to other sensors without providing the pedal rotation sensor 107.

Next, a function block diagram of the portion using the trigger signal will be shown in FIG. 6. The computation part 1021 has a control coefficient computing part 1201, a regeneration target computing part 1202, a multiplier 1203, a PWM code generating part 1204, and a control activation final determination part 1211. The multiplier 1203 and the PWM code generating part 1204 operate as the PWM control part.

The control coefficient computing part 1201 computes the control coefficient, as described below, according to the trigger signal and vehicle speed, and outputs the result to the multiplier 1203. The control activation final determination part 1211 determines whether or not to output the control coefficient from the control coefficient computing part 1201 to the multiplier 1203 based on input with or without torque input from the torque input part 1027, and an override signal. The override signal is a signal inputted by the user from the operation panel or the like, and indicates whether or not to make regeneration unconditionally active, for example. More specifically, when there is input with torque input from the torque input part 1027, the control activation final determination part 1211 then temporarily changes the control coefficient outputted from the control coefficient computing part 1201 to a minimum value and outputs the result. However, when there is input without torque input, then the control activation final determination part 1211 outputs the control coefficient outputted from the control coefficient computing part 1201 as is. If there is the override signal, in other words if regeneration is intentionally performed during torque input, the control activation final determination part 1211 then outputs the control coefficient signal outputted from the control coefficient computing part 1201 as is, even if there is torque input.

The regeneration target computing part 1202 computes the regeneration target value according to the vehicle speed and the like from the vehicle-speed input part 1024, and outputs the multiplication result to the multiplier 1203. The multiplier 1203 multiplies the control coefficient and the regeneration target value and outputs the result of the multiplying to the PWM code generating part 1204. The PWM code generating part 1204 generates a PWM code corresponding to the PWM duty ratio based on the output from the multiplier 1203, the vehicle speed, and the like, and outputs the PWM code to the motor drive timing generator part 1026.

Figure 7:
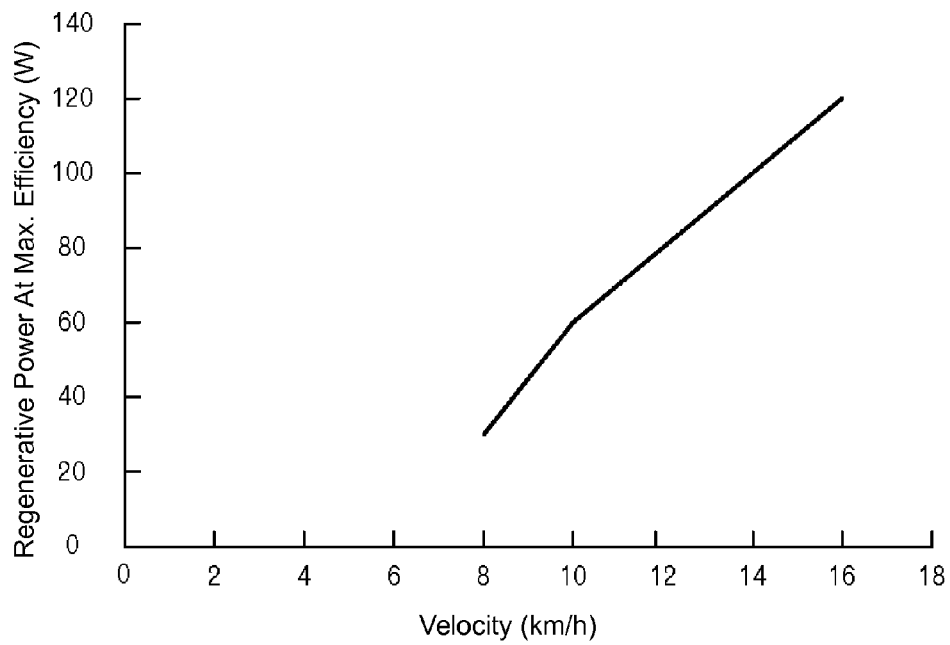
FIG. 7 is a view showing the most efficient maximum power for the given speeds.
Figure 8:
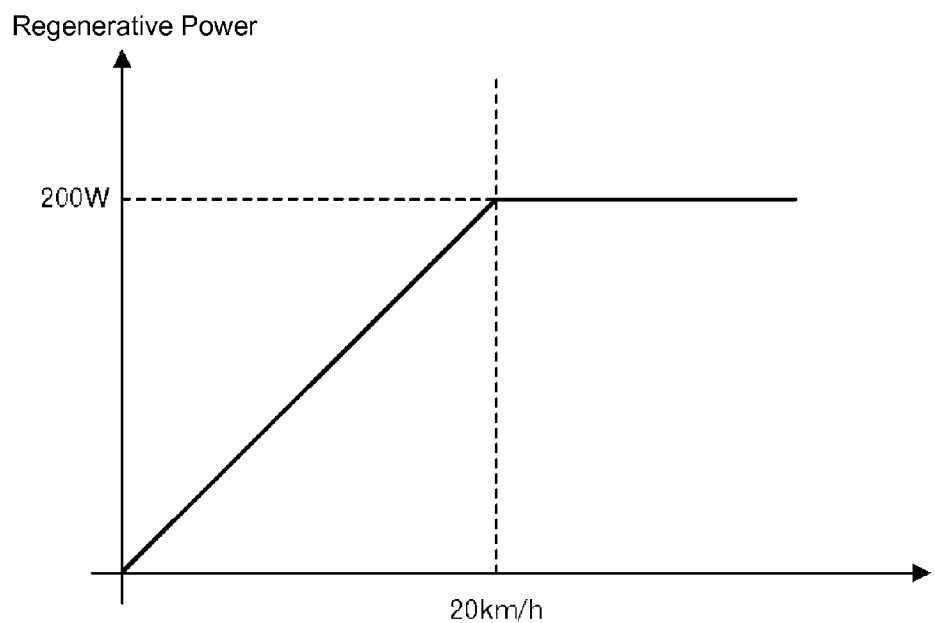
FIG. 8 is a view showing the relationship between speed and regeneration target value.

As described above, the regeneration target computing part 1202 computes the regeneration target value according to vehicle speed and the like. As shown in FIG. 7, depending on the vehicle speed there is a set power that the motor generates power at where regeneration efficiency is the greatest, for example. As shown in FIG. 8, it is preferable to configure the regeneration target value according to the vehicle speed so that the motor generates power where regeneration efficiency is greatest as such, for example. In the present specification, the regeneration target value is a parameter value for motor control when the motor is in a regeneration state (in other words, a power generation state), and this parameter value derives the drive state of the motor, such as when the power generation (regeneration) efficiency of the motor reaches maximum (or reaches a desired generation efficiency). In this regeneration state, the parameter for motor control used in the computations of the PWM code generating part is configured, such as the power needed to control the motor for such optimum generation efficiency; the duty; the torque generated by the motor; the electric current amount flowing from the motor to the battery, and the like. If the calculations are done in torque units, then a relationship between the torque and vehicle speed that results in the maximum regeneration efficiency (generation efficiency) is identified ahead of time, and the regeneration target computing part 1202 computes the torque target value according to the current vehicle speed, for example. If the vehicle speed decreases due to braking, then the regeneration target value also decreases. A curve as shown in FIG. 8 is one example of this, and the curve may be configured from a viewpoint such as motor and battery protection.

The multiplier 1203 multiplies a control coefficient C outputted from the control activation final determination part 1211 with a regeneration target value V outputted from the regeneration target computing part 1202, and outputs C×V to the PWM code generating part 1204. The PWM code generating part 1204 generates a PWM code based on the duty ratio and according to the vehicle speed and the like and C×V. If V is torque, then C×V will also be torque, so the torque is converted into the PWM code by a conversion coefficient or the like based on the torque C×V and the torque according to the vehicle speed, for example.

Figure 9:
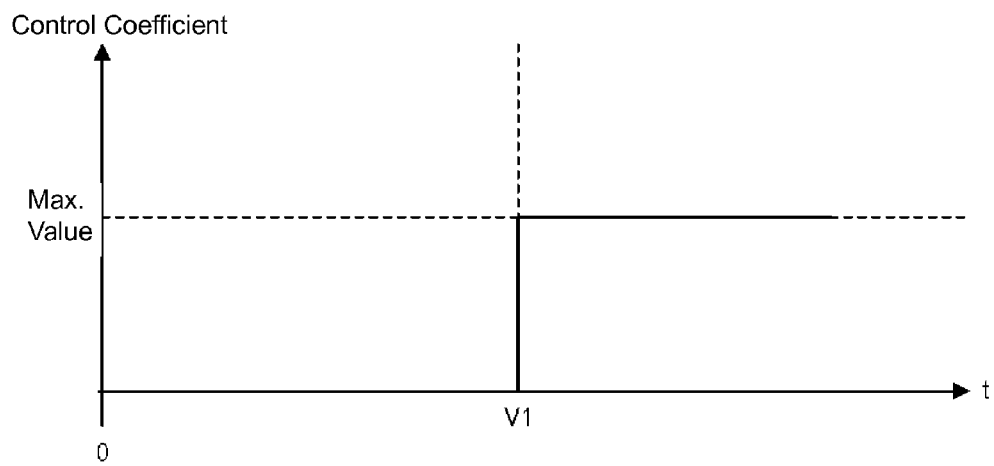
FIG. 9 is a view showing the relationship between a control coefficient and speed.

Next, the computation contents of the control coefficient computing part 1201 will be explained using FIGS. 9 to 15. FIG. 9 shows a graph expressing the relationship between speed and the control coefficient. In the present embodiment, when the trigger signal indicating the start of regeneration control is received, the control coefficient computing part 1201 stores a vehicle speed V1 at the time of receiving this trigger signal in the memory 10211 or the like. If the subsequent vehicle speed is greater than or equal to the vehicle speed V1, then the control coefficient computing part 1201 basically outputs the pre-determined maximum value of the control coefficient.

Figure 10:
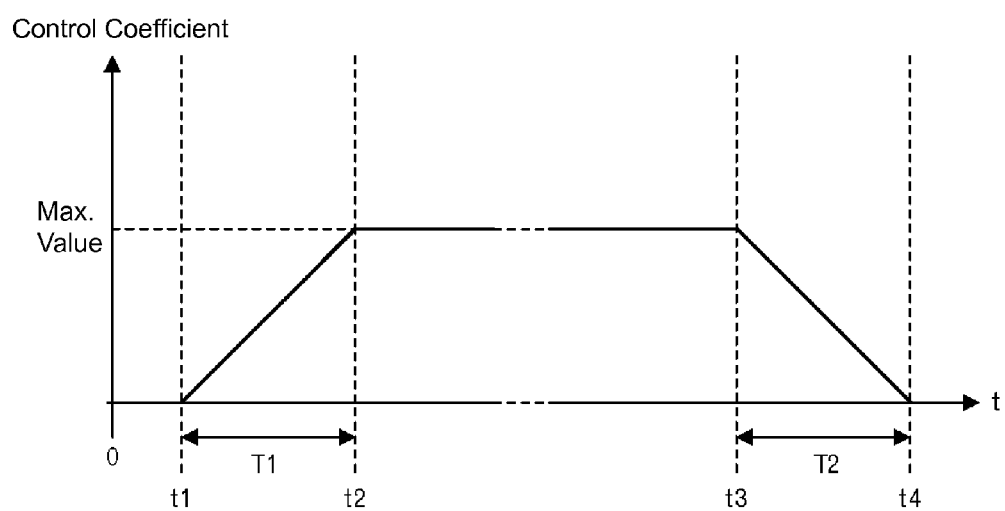
FIG. 10 is a view showing one example of time lapse of the control coefficient.

However, the rider will feel discomfort if the regeneration control value is set to a large value from the start, or if control is performed to suddenly set the control regeneration value to 0. Accordingly, as shown in FIG. 10, if the start of regeneration control is signaled at time t1, then a slew-rate control is preferable in which the control coefficient slowly rises only during interval T1 and then reaches the maximum value at time t2, for example. In a similar manner, even if the stop of regeneration control is signaled at time t3, a slew-rate control is preferable in which the control coefficient is slowly decreased only during interval T2 and then reaches the minimum value at time t4, for example.

In the present embodiment, the maximum value of the control coefficient is assumed to be "1," but a numerical value greater than or equal to "1" may be used as well. Depending on the circumstance, the maximum value of the control coefficient may be variable with time. The minimum value of the control coefficient is assumed to be "0," but a numerical value other than "0" may also be used. Depending on the circumstance, the minimum value of the control coefficient may be variable with time.

Figure 11:
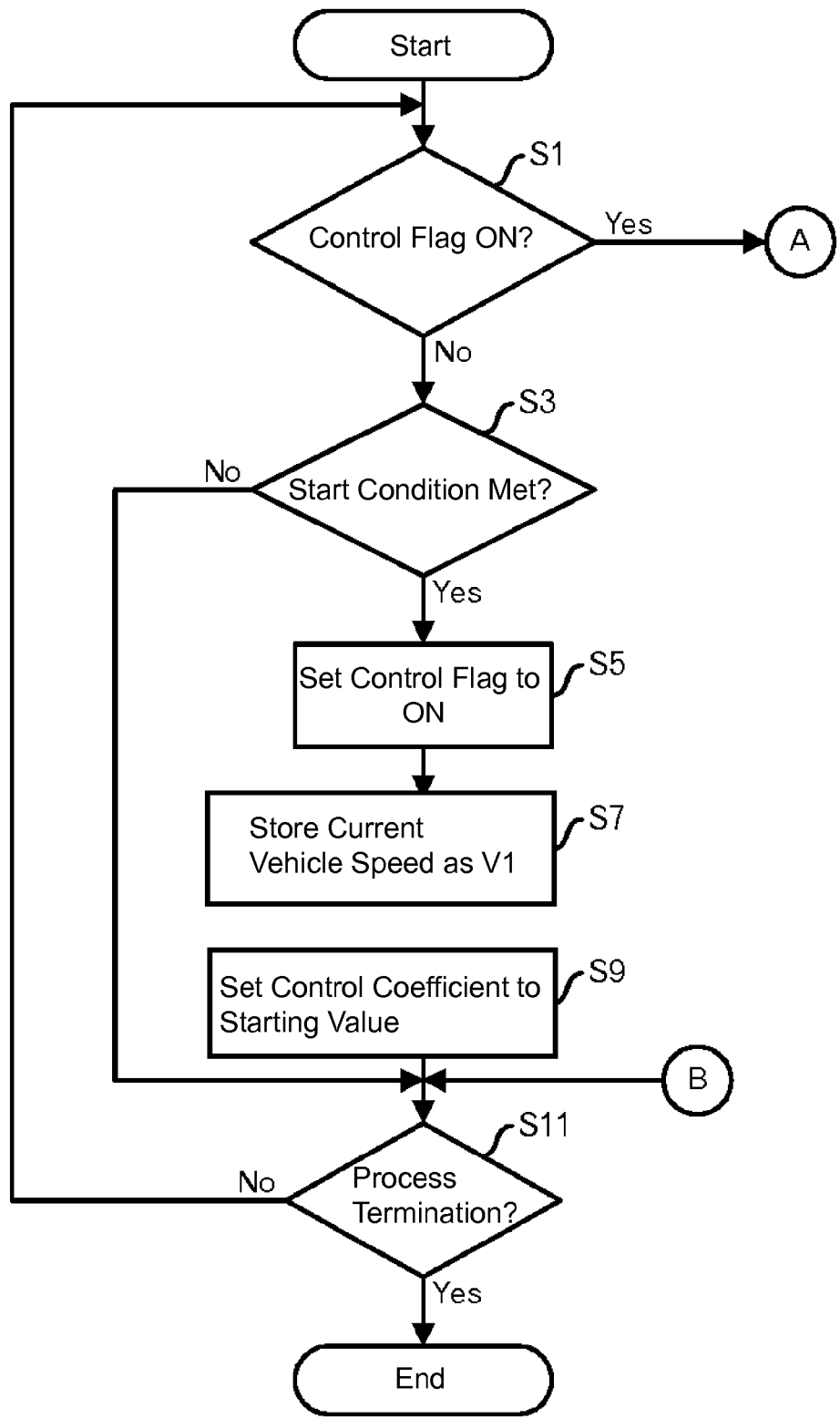
FIG. 11 is a view showing a main process flow.

Next, a process flow of the control coefficient computing part 1201 will be explained using FIGS. 11 and 12. The control coefficient computing part 1201 determines whether a control flag is set to ON (FIG. 11: step S1). The control flag is set to ON when during regeneration control, and set to OFF when not during regeneration control. If the control flag is ON, then the process moves to the processes in FIG. 12 via a terminal A.

However, if the control flag is OFF, then the control coefficient computing part 1201 determines whether or not a condition for the start of regeneration control has been met (step S3). The condition for the start of regeneration control is that the trigger signal is the signal that indicates the start of regeneration control. In other words, this is (A) to (C) described above. If the condition for the start of regeneration control has not been met, then the process moves to step S11.

However, if the condition for start of regeneration control has been met, then the control coefficient computing part 1201 sets the control flag to ON (step S5). The control coefficient computing part 1201 stores the current vehicle speed in the memory 10211 or the like as V1 (step S7). The control coefficient computing part 1201 sets a pre-determined starting value for the control coefficient (step S9). The starting value may be 0, or may be a positive value close to 0, for example. This control coefficient is outputted by the multiplier 1203, and the product of this control coefficient is computed with the regeneration target value, which is the output from the regeneration target computing part 1202. The product is then outputted to the PWM code generating part 1204.

The control coefficient computing part 1201 determines if process termination has been indicated (step S11). The control coefficient computing part 1201 determines whether or not a power-off has been signaled by the rider, for example. If there is no process termination then the process returns to step S1. However, if at a stage where the process is to be terminated, then the process is terminated.

Figure 12:
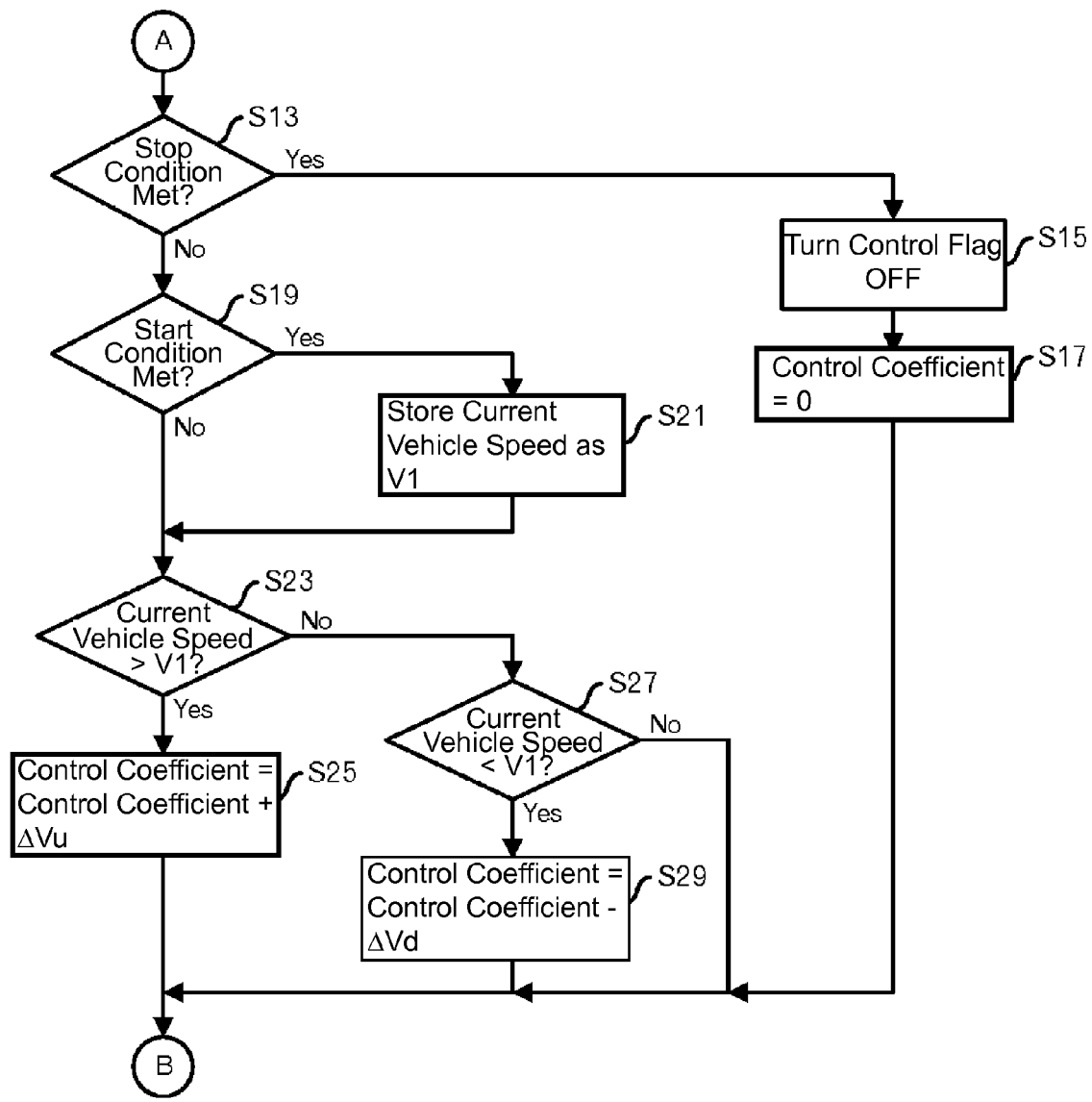
FIG. 12 is a view showing a main process flow.

Moving onto the explanation of the processes in FIG. 12, the control coefficient computing part 1201 determines whether a condition for the stop of regeneration control has been met (step S13). The condition for the stop of regeneration control is that the trigger signal is a trigger signal that indicates the stop of regeneration control. In other words, this is (D) to (G) described above. If the condition for the stop of regeneration control has been met, then the control coefficient computing part 1201 sets the control flag to OFF (step S15). The control coefficient computing part 1201 sets the control coefficient to 0 (step S17). The control coefficient may be set to a prescribed minimum value instead of 0. Afterwards, the process returns to step S11 in FIG. 11 via a terminal B.

However, if the condition for the stop of regeneration control has not been met, then the control coefficient computing part 1201 determines whether the start condition has been met again (step S19). In other words, the condition is that the trigger signal is a trigger signal that indicates the start of regeneration control. Specifically, this is when a signal is received indicating a second start of regeneration control, due to detecting the state of (A) to (C) described above again without outputting the trigger signal indicating the stop of regeneration control.

When the start condition has been met again, the control coefficient computing part 1201 stores the current vehicle speed V1 in the memory 10211 or the like (step S21). And then the process moves to step S23. However, if the start condition has not necessarily been met again, then the process moves to step S23.

The control coefficient computing part 1201 determines whether the current vehicle speed is greater than the vehicle speed V1 stored in the memory 10211 or the like (step S23). If the current vehicle speed is greater than the vehicle speed V1, then the control coefficient computing part 1201 updates the control coefficient by control coefficient+$\Delta$Vu (step S25). However, the control coefficient cannot be increased above a preset maximum value (1, for example). $\Delta$Vu is a pre-configured increment size. This new control coefficient is outputted to the multiplier 1203. Afterwards, the process returns to step S11 in FIG. 11 via the terminal B.

However, if the current vehicle speed is less than the vehicle speed V1, then the control coefficient computing part 1201 updates the control coefficient by control coefficient−$\Delta$Vd (step S29). The control coefficient cannot be decreased below a preset minimum value (0, for example). $\Delta$Vd is a pre-configured decrement size. $\Delta$Vd may be consistent with $\Delta$Vu or may not be consistent. This new control coefficient is outputted to the multiplier 1203. Afterwards, the process returns to step S11 in FIG. 11 via the terminal B. If the current vehicle speed is not necessarily lower than vehicle speed V1, in other words if the current vehicle speed=V1, then the process returns to step S11 in FIG. 11 via the terminal B.

By performing the above processes, the control coefficient for regeneration control can be increased or decreased in accordance with the difference between the current vehicle speed and the vehicle speed V1 configured on the basis of the start signal for regeneration control by the rider, in order to have the current vehicle speed be as close as possible to the vehicle speed V1. Thus, control is performed to reach the vehicle speed V1 that the rider prefers. In other words, the rider is no longer inconvenienced by having to turn the brakes ON and OFF, and can avoid hand fatigue caused by continually using the brakes.

However, the focus here is on recovering energy through regeneration (generation), and thus the current vehicle speed may be too high at times to control for the vehicle speed V1, based on regeneration efficiency and charging limits of the battery. There may also be times when the current vehicle speed cannot be controlled to the vehicle speed V1 even if the control coefficient is set at the minimum value, due to gradual slopes or the like. However, if there are no explicit instructions from the rider to stop regeneration control, and if the current vehicle speed increases again and exceeds the vehicle speed V1, then the control coefficient will start to increase and regeneration control will start automatically. In other words, the rider does not need give instructions every time.

The vehicle speed V1 that the rider prefers may change along the way because of a change in running conditions. In this case, in the present embodiment the vehicle speed V1 is updated by signaling the start of regeneration control again, without performing any stop signal for regeneration control. This aspect also saves effort on the part of the rider.

Figure 13:
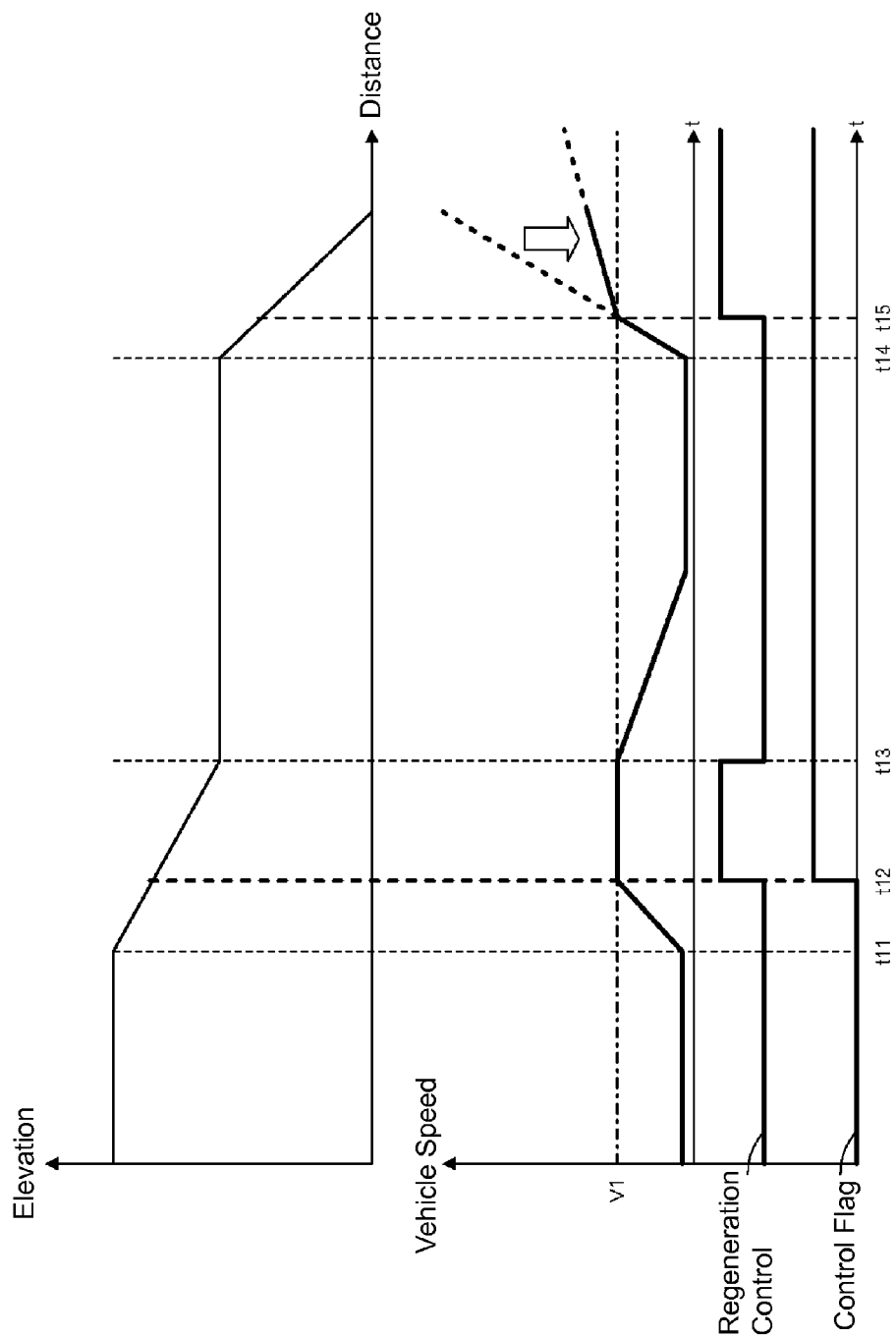
FIG. 13 is a view showing one example of regeneration control.
Figure 14:
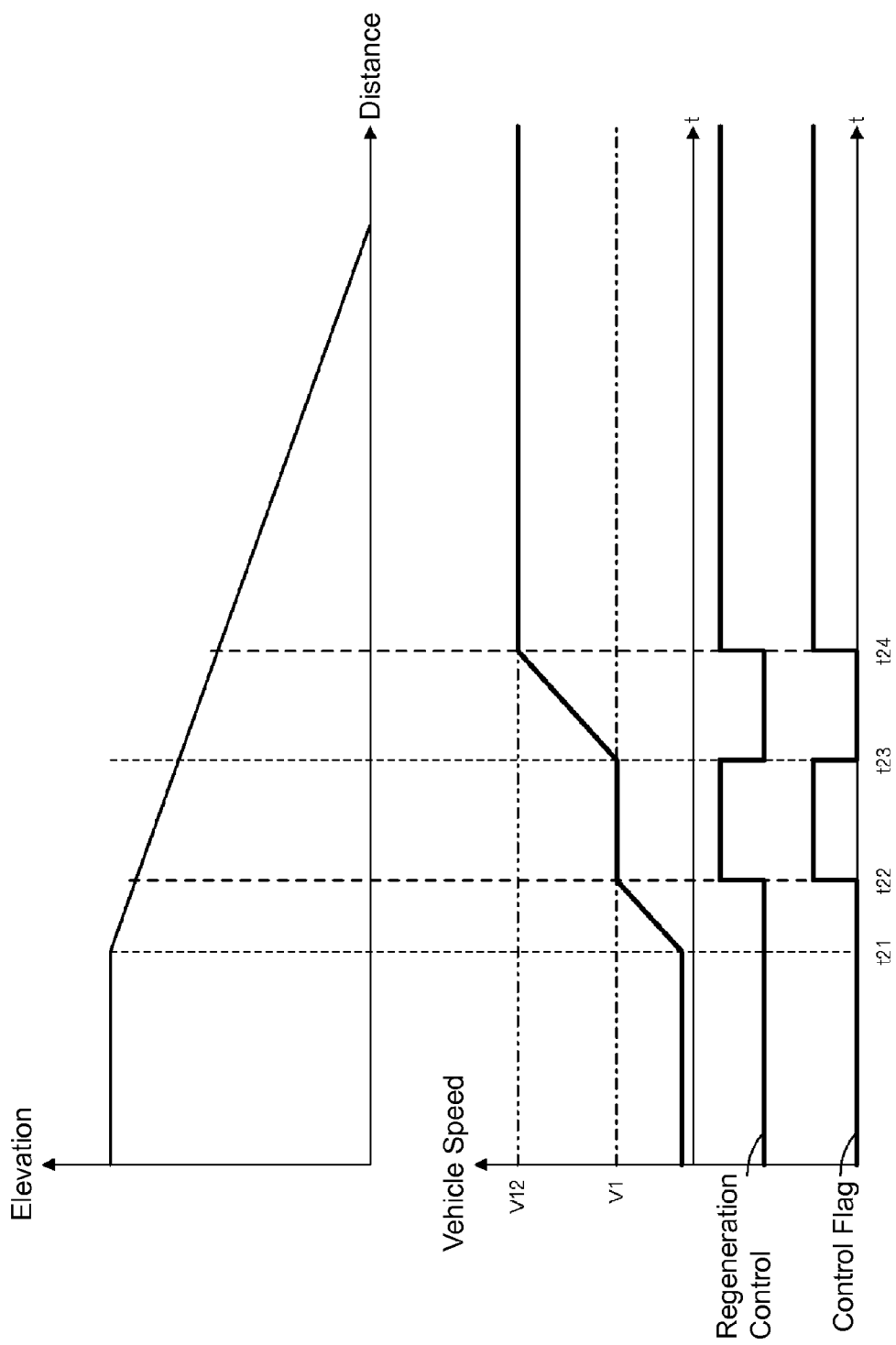
FIG. 14 is a view showing one example of regeneration control.
Figure 15:
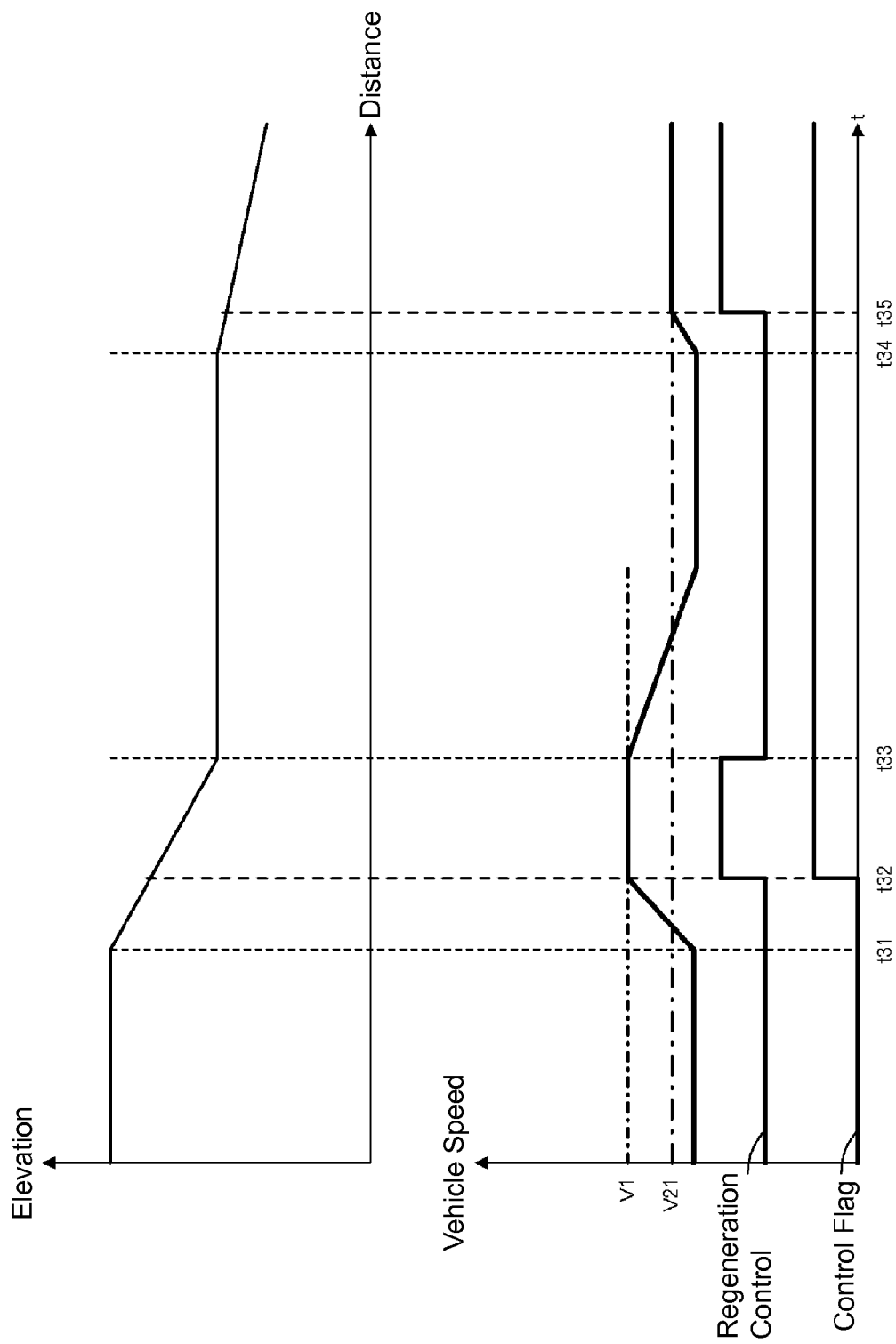
FIG. 15 is a view showing one example of regeneration control.

The examples of regeneration control realized in the process flow shown in FIGS. 11 and 12 are explained using FIGS. 13 to 15.

In FIG. 13 the top part represents a change in elevation of a slope in a scenario in which an electric power-assisted vehicle descends such a slope. The bottom part in FIG. 13 represents a time lapse between vehicle speed, ON and OFF of the regeneration control and ON and OFF of the control flag.

When the electric power-assisted vehicle begins to descend a gradual slope from time t11, the vehicle speed increases. If the rider wants to suppress acceleration at time t12 after the increase in vehicle speed, the rider performs a start signal of regeneration control. The current vehicle speed at this time t12 acts as V1. The regeneration control starts, and the control flag is set to ON. Thus, a rise in vehicle speed is suppressed by regenerative braking, and the vehicle speed is generally maintained at V1. When the descent down the gradual slope has ended at time t13, the vehicle speed will naturally decrease, so the control coefficient begins to decrease and ultimately reaches the minimum value. The regeneration control is thereby ceased, and even if the control flag remains ON there is no regenerative braking anymore. A natural decline in vehicle speed occurs without an excessive drop in vehicle speed. Afterwards, a steep slope is descended at time t14. At this time, the vehicle speed increases rapidly, but since the control flag is still ON, regeneration control will restart automatically upon the vehicle speed reaching V1 even without instructions for the start of regeneration control from the rider. Regenerative braking will suppress acceleration, so the increase in vehicle speed will be smoother, as compared to the dotted line, which shows a scenario without regenerative braking. However, the effects of regenerative braking are limited due to the large increase in acceleration from steep slopes.

Other examples are also possible. In FIG. 14 the top part represents a change in elevation of a downward slope in a scenario in which an electric power-assisted vehicle descends such a slope. The bottom part in FIG. 14 represents a time lapse between vehicle speed, ON and OFF of the regeneration control and ON and OFF of the control flag.

When the electric power-assisted vehicle begins to descend a gradual slope from time t21, the vehicle speed increases. If the rider wants to suppress acceleration at time t22 after the increase in vehicle speed, the rider performs a start signal of regeneration control. The current vehicle speed at this time t22 acts as V1. The regeneration control starts, and the control flag is set to ON. Thus, a rise in vehicle speed is suppressed by regenerative braking, and the vehicle speed is generally maintained at V1. Afterwards, if the rider at time t23 wants an increase in vehicle speed due to changes in the surrounding environment such as a widening of the road width even while descending the same slope, then the rider performs a stop signal for regeneration control, for example. The control coefficient thereby reaches the minimum value (0, for example), and regeneration control is deactivated, so the vehicle speed begins to increase. After that, the vehicle speed at time t24 is V2 (>V1), but if the rider wants to suppress acceleration at this time, then the rider performs the start signal for regeneration control again. However, because the stop signal for regeneration control was performed at time t23, the current vehicle speed at time t24 is set to V1 (V12 in FIG. 14) through the process in FIG. 11, not the process in FIG. 12. Then, the control flag turns to ON again, and the vehicle speed will be maintained around V12. As such, regeneration control can be performed so as to reach a suitable vehicle speed by repeating the stopping of the regeneration control and the starting of the regeneration control.

Further examples are possible. In FIG. 15 the top part represents a change in elevation of a downward slope in a scenario in which an electric power-assisted vehicle descends such a slope, in a manner similar to FIGS. 13 and 14. The bottom part in FIG. 15 represents a time lapse between vehicle speed, ON and OFF of the regeneration control and ON and OFF of the control flag.

When the electric power-assisted vehicle begins to descend a gradual slope from time t31, the vehicle speed increases. If the rider wants to suppress acceleration at time t32 after the increase in vehicle speed, the rider performs a start signal of regeneration control. The current vehicle speed at this time t32 acts as V1. The regeneration control starts, and the control flag is set to ON. Thus, a rise in vehicle speed is suppressed by regenerative braking, and the vehicle speed is generally maintained at V1. When the descent of the gradual slope has ended at time t33, the vehicle speed will naturally decrease, so the control coefficient begins to decrease and ultimately reaches the minimum value. The regeneration control is thereby ceased, and even if the control flag remains ON there is no regenerative braking anymore. A natural decline in vehicle speed occurs without an excessive drop in vehicle speed. Afterwards, a gradual slope is descended at time t34. The vehicle speed gradually increases, and at time t35 another start of regeneration control will be signaled even without instructions from the rider to stop regeneration control due to narrow road width or other conditions. Then, the vehicle speed at time t35 is set to V1 (V21 in FIG. 15). Thus, regenerative braking force suppresses a rise in vehicle speed, and the vehicle speed is generally maintained at the new V21.

As described above, the rider can signal using simple methods in order to automatically obtain a suitable regenerative braking force. If the regenerative braking becomes troublesome then the regenerative braking will automatically stop, and automatically restart when appropriate. In this way, the inconvenience caused by frequent and continuous use of the brakes can be eliminated or reduced. Additionally, the rider can freely change the degree of regenerative braking, and adjust the degree in accordance with the running condition or the like.

For example, if the rider wishes to ride at a vehicle speed of around 20 km/hr, and then wants to avoid loss caused by an increase in air resistance due to a vehicle speed going beyond 20 km/hr, or to extend the riding distance of the vehicle by regenerating (generating) kinetic energy at speeds likely to exceed 20 km/hr, then as long as regeneration control is started once at 20 km/hr the state of regeneration control can be maintained. This is both convenient and efficient.

The present invention is not limited to the embodiments described above. A plurality of steps may be combined to signal the start or stop of regeneration control, such as the stop being signaled by the pedals rotation forward past a prescribed phase after the signaling switch 106 is used to start regeneration control, for example. The left brake and right brake may be designed with different functions.

A specialized circuit may be used for a part of the computation part 1021, or a microprocessor may execute a program to realize functions such as those described above.

A specialized circuit may be used for a part or all of the controller 102 for driving a motor, or a microprocessor may execute a program to realize functions such as those described above.

Figure 16:
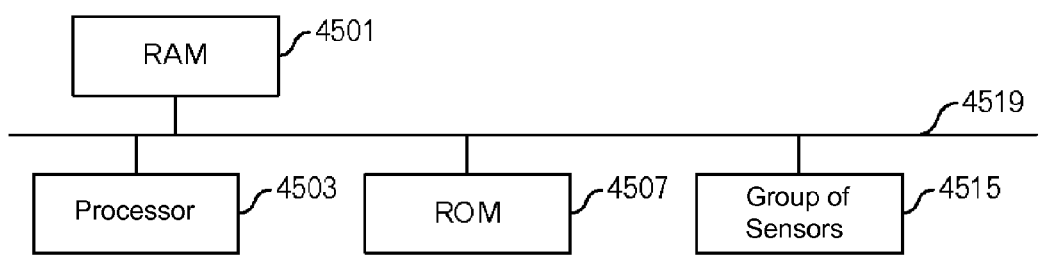
FIG. 16 is a function block diagram when using a microprocessor.

In this case, as shown in FIG. 16, the controller 102 for driving a motor has a RAM (Random Access Memory) 4501, a processor 4503, a ROM (Read Only Memory) 4507, and a group of sensors 4515, connected by a bus 4519. The program and, if present, operating system (OS) for running the processes in the present embodiment are stored in the ROM 4507 and executed by the processor 4503. The threshold and other values are recorded, and such parameters are also read out. The processor 4503 controls the group of sensors 4515 described above to obtain a measurement. Half-processed data is stored in the RAM 4501. The processor 4503 sometimes contains the ROM 4507, and sometimes contains the RAM 4501. In the embodiment of the present technology, a control program used to run the processes described above may be stored and distributed on a computer-readable removable disk, and written to the ROM 4507 using a ROM writer. Such a computer device realizes each type of function described above by the programs (and sometimes, OS) and hardware mentioned above such as the processor 4503, RAM 4501, ROM 4507 working together organically.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A controller for driving a motor in a motor driven vehicle, the controller comprising:
   a detection part that detects a start signal or stop signal for regeneration control from a rider;
   a control coefficient computing part that identifies, as a first vehicle speed, the speed of the vehicle when the detection part detects the start signal for regeneration control, the control coefficient computing part assigning a prescribed value to a control coefficient that determines a value of a control parameter that controls the motor relative to a target value of the control parameter, the target value being a value of the control parameter at which the motor achieves a desired power generation efficiency, the control coefficient computing part increasing the control coefficient if a current vehicle speed becomes faster than the first vehicle speed and decreasing the control coefficient if the current vehicle speed becomes slower than the first vehicle speed, the control coefficient computing part continuing the increasing and decreasing until the detection part detects the stop signal for regeneration control; and
   a control part that derives a value of the control parameter in accordance with the target value of the control parameter and the control coefficient computed by the control coefficient computing part, the control part forwarding the derived value of the control parameter to the motor to control driving of the motor.

2. The controller for driving a motor according to claim 1, wherein the control coefficient computing part identifies, as a second vehicle speed, the speed of the vehicle when the detection part detects another start signal for regeneration control before the stop signal for regeneration control has been detected, the control coefficient computing part increasing the control coefficient if a current vehicle speed becomes faster than the second vehicle speed, and decreasing the control coefficient if the current vehicle speed becomes slower than the second vehicle speed.

3. The controller for driving a motor according to claim 1, wherein a maximum value and a minimum value of the control coefficient is assigned, and
   wherein the control coefficient computing part changes the control coefficient so that the control coefficient does not exceed the maximum value and does not go below the minimum value.

4. The controller for driving a motor according to claim 1, wherein the control coefficient computing part stops regeneration control when the detection part detects the stop signal for regeneration control.

5. The controller for driving a motor according to claim 1, wherein the start signal for regeneration control is detected by: reverse rotation of a pedal exceeding a prescribed phase angle; an ON state of a signaling switch that signals the start of regeneration control; and a brake switch turning ON continuously within a prescribed amount of time.

6. The controller for driving a motor according to claim 1, wherein the stop signal for regeneration control is detected by: forward rotation of the pedal exceeding a prescribed angle; torque input; an OFF state of a signaling switch that signals the start of regeneration control; or a brake switch turning ON continuously within a prescribed amount of time.

7. The controller for driving a motor according to claim 3, wherein even if the start signal for regeneration control has not been detected, the control coefficient computing part increases the control coefficient if the current vehicle speed becomes faster than the first vehicle speed after the control coefficient reaches the minimum value.

* * * * *